United States Patent [19]

Nagase

[11] 4,073,541

[45] Feb. 14, 1978

[54] ELECTRO-PNEUMATIC CONTROL APPARATUS FOR AN ELECTRIC/FRICTION BRAKE BLENDING SYSTEM

[75] Inventor: Minoru Nagase, Kobe, Japan

[73] Assignee: The Nippon Air Brake Company, Ltd., Kobe, Japan

[21] Appl. No.: 797,102

[22] Filed: May 16, 1977

[30] Foreign Application Priority Data

June 2, 1976 Japan .................................. 51-72003

[51] Int. Cl.² ............................................. B60T 13/74
[52] U.S. Cl. ...................................... 303/3; 303/22 R
[58] Field of Search ...................... 188/195; 303/3, 15, 303/20, 22 R, 22 A

[56] References Cited

U.S. PATENT DOCUMENTS 3,944,287  3/1976  Nagase .................................. 303/3 X Primary Examiner—Stephen G. Kunin
Attorney, Agent, or Firm—R. W. McIntire, Jr.

[57] ABSTRACT

A load-weighed voltage corresponding to a pneumatic brake command signal is obtained from a pressure/electric transducer to control the electric brakes of a vehicle also equipped with friction brakes. An electrical feedback signal representing the electric brake effectiveness is compared to the transducer output signal to derive an error signal corresponding to the friction brake requirement necessary to supplement the electric brake sufficiently to satisfy the brake command. An electric-pneumatic transducer converts this error signal to a pneumatic signal which is connected to a first control chamber of a self-lapping type relay valve device whose delivery port is connected to the vehicle brake cylinders. A cut-off valve controls communication of the pneumatic brake command signal with a second control chamber of the relay valve to effect operation of the relay valve only in the event of a malfunction of the electrical circuit components performing the friction brake requirement function.

5 Claims, 3 Drawing Figures

ELECTRO-PNEUMATIC CONTROL APPARATUS FOR AN ELECTRIC/FRICTION BRAKE BLENDING SYSTEM

BACKGROUND OF THE INVENTION

The present invention is related to a brake system of the type combining electric and friction brake control means in a manner wherein the electric brake means is supplemented by the friction brake means an amount dependent upon the inability of the electric brake means to continuously produce vehicle brake effort according to the brake command signal.

Conventional braking systems of the above-mentioned type may be placed in either of two classes, as represented by the prior art showings in FIGS. 1 and 2 of the drawings, wherein the brake command and the effective electric brake effort are compared by pneumatic means and by electric means, respectively, to determine the amount of friction braking required to satisfy the brake command. In FIG. 1, the brake control system comprises a pneumatic/electric transducer device 1 subject to a pneumatic brake command signal BV supplied from a brake valve or the like (not shown) and a vehicle load signal supplied from a load responsive device 2, which may be subject to fluid pressure from the vehicle air springs (not shown). The output of transducer 1 is an electrical signal representative of the brake command as modified in accordance with vehicle load conditions. An electrical brake control system 3 of the vehicle is operative responsive to the load modified brake command signal, with the degree of effectiveness of the electric brake being detected by torque converter 4. The output of the torque converter 4 thus represents a feedback signal indicative of the amount of electric brake effort actually produced. An amplifier 6 passes this feedback signal to an electric-pneumatic transducer 7, where it is converted back to a fluid pressure signal and supplied to a self-lapping type relay valve device 8 and specifically to the pressure chamber 12 of the relay valve.

While the above-mentioned electric brake feedback signal is being generated, the brake command signal BV is concurrently supplied via pipe 20 to a pressure chamber 13 of relay valve device 8. A diaphragm piston 12a subject to the fluid pressure in chamber 12 and a piston 13a subject to the fluid pressure in chamber 13 act opposingly to control the opening and closing of the relay valve supply and exhaust valve assembly 14 such that an output fluid brake pressure is derived proportional to the difference between the brake command and effective electric brake effort, such brake pressure representing the friction braking required to supplement the electric braking sufficiently to meet the vehicle brake command BV.

As a further feature of relay valve device 8, well known to those skilled in the art, there may be provided a chamber 15 to which fluid pressure from the vehicle air springs is supplied to effect movement of a diaphragm piston 16 an amount dependent upon the vehicle load. A roller 17 connected to move with piston 16 acts between a pair of pivotal levers 18, 18a to which diaphragm pistons 12a, 13a are connected, thereby varying the ratio between the brake command signal BV and electric brake feedback signal. In this way, the fluid brake pressure produced by relay valve device 8 to supplement the electric brake effort is adjusted according to the vehicle load condition.

A disadvantage attributed to a control system of this type is the poor response of the relay valve device to rapid changes in the effective intensity of the electric brake effort. Consequently, the blending of the electric and pneumatic brake effort tends to be erratic, due to excessive cycling of the pneumatic brake in attempting to supplement the electric brake so that passenger comfort is adversely affected.

In FIG. 2 of the drawings, there is shown another type of brake control system known in the art, which overcomes the above-mentioned disadvantage of the system of FIG. 1, but which has a different disadvantage. This FIG. 2 arrangement employs a conventional type relay valve device 9, which differs from relay valve device 8 of FIG. 1 in that there is no pneumatic comparison function provided in order to derive the friction brake requirement. The friction brake requirement is instead obtained via an electrical summing junction 5, where the brake command signal BV is connected via a branch line 19 and compared to the output of torque converter 4, which reflects the degree of electric brake effectiveness. Thus, comparison of the brake command and electric brake effectiveness produced in response to the brake command is accomplished electrically external of the relay valve instead of pneumatically within the relay valve device, as in FIG. 1. The error signal resulting from this electrical comparison represents an electrical signal to a corresponding fluid pressure signal that is supplied to the control chamber of relay valve device 9, which responds to produce fluid brake pressure accordingly. While this arrangement tends to eliminate the disadvantage found in the FIG. 1 arrangement, it is unacceptable in actual practice because a necessary condition of operation is that the electrical apparatus be absolutely free of malfunction. Otherwise, the friction brake requirement signal supplied to relay valve device 9 will be inaccurate or may fail to materialize at all.

SUMMARY OF THE INVENTION

The object of the present invention, therefore, is to provide an electric/friction brake blending control system which combines the advantageous features of the respective prior art systems to obtain improved response characteristics without the risk of friction brake loss in the event of an electrical malfunction.

In carrying out this objective, there is provided a relay valve device having a pair of diaphragm pistons capable of acting in concert or independently to actuate the supply and exhaust valve assembly. The one diaphragm piston is subject to fluid pressure representing the friction brake requirement, as derived electrically in accordance with the FIG. 2 arrangement of the prior art, while the second diaphragm piston is subject to the pneumatic brake command signal from the vehicle brake valve, or the like. An electro-magnetic valve subject to the output of a malfunction detector circuit cuts off the pneumatic brake command signal except when a malfunction is detected. In the absence of a malfunction, the relay valve device responds to the friction brake requirement signal derived electrically by means external of the relay valve. When a malfunction exists, the relay valve device is responsive to the brake command signal, which over-rides the electrically derived friction brake requirement signal so that in this sense, the friction brake serves as a back-up having the capability of satisfying the total vehicle braking.

DESCRIPTION AND OPERATION

Figure 2:
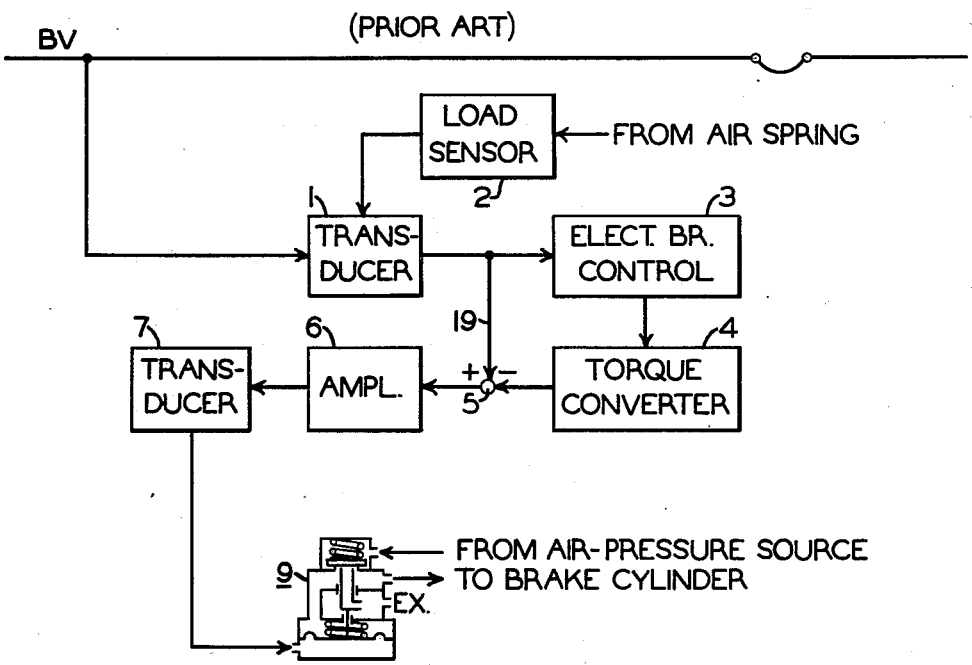
FIG. 2 of the drawings is a block schematic showing an alternate arrangement for providing a control system as in FIG. 1.
Figure 3:
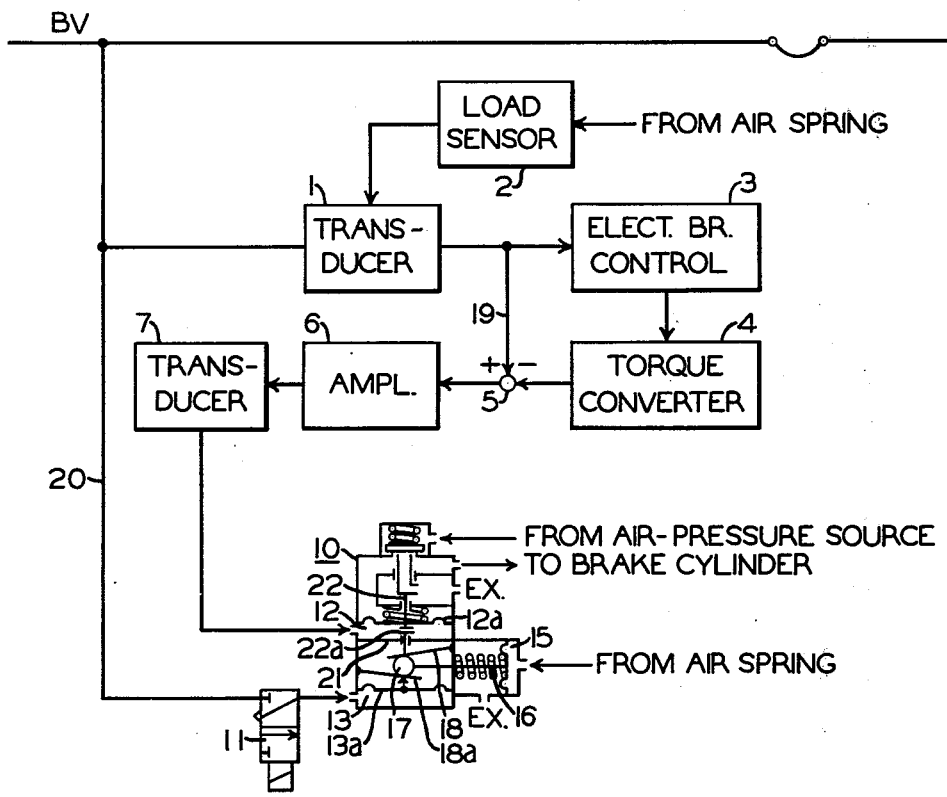
FIG. 3 of the drawings is a block schematic showing an electric/friction brake blending control system combining the advantages of the control systems of FIGS. 1 and 2 in accordance with the present invention.

In the arrangement of FIG. 3 embodying the present invention, the basic control system shown in FIG. 2 is employed, including summing junction 5 for electrically comparing the brake command signal BV via wire 19 and the electric brake effort feedback signal provided by torque converter 4, the resulting error signal being the friction brake requirement signal supplied via transducer 7. The pneumatic pressure comprising this friction brake requirement signal is supplied to chamber 12 of a relay valve device 10, which is modified somewhat from relay valve device 8. The lower portion of relay valve device 10 is identical to the corresponding portion of relay valve device 8 and bears the same reference numerals for corresponding parts. The upper portion of relay valve device 10 differs only in that the relative positions of partition 21 and diaphragm 12a are reversed, with stem 22 being separated, as indicated by numeral 22a. Corresponding parts of this upper portion of relay valve device 10 also bear identical reference numerals as the corresponding parts of relay valve device 8.

The pressure supplied to chamber 12 representative of the friction brake requirement acts on diaphragm piston 12a to effect operation of valve assembly 14 to control the fluid brake pressure to which the vehicle friction brakes respond. In this sense, relay valve device 10 operates exactly the same as relay valve device 9 of FIG. 2, with the friction brake requirement being derived electrically by means including summing junction 5 external of the relay valve device.

Figure 1:
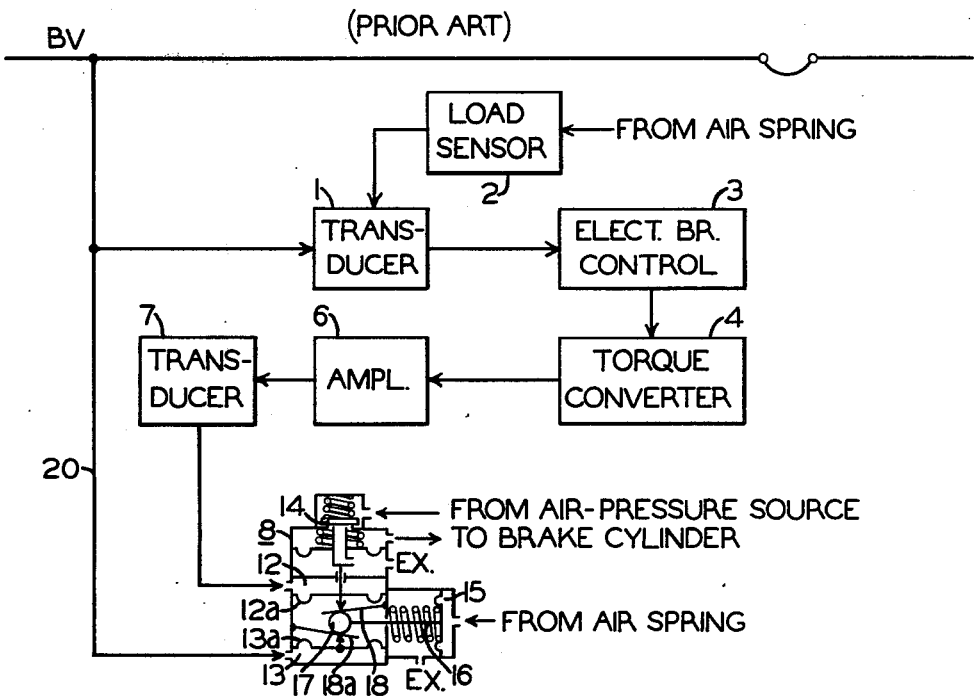
FIG. 1 of the drawings is a block schematic showing a conventional electric/friction brake blending control system.

FIG. 3 is also patterned after the arrangement of FIG. 1 in that pipe 20 is provided to connect the brake command signal BV from a brake valve or the like to chamber 13 of relay valve device 10. In order to prevent the relay valve device from responding to this brake command signal under normal circumstances, an electromagnetic valve device 11 is interposed in line 20. Electromagnetic valve device 11 cuts off the supply of fluid pressure to chamber 13 except when a malfunction is detected in the electrical comparison circuitry of FIG. 3, as monitored by means (not shown). Thus, under normal circumstances, the system of FIG. 3 functions exactly the same as that of FIG. 2 and thus offers the advantage of improved response and more accurate control, by reason of the friction brake requirement being determined electrically.

In the event a malfunction should occur in the comparison circuitry providing this electrical determination of the friction brake requirement (difference between brake command and effective electric brake effort), a signal will be supplied to the solenoid of electromagnetic valve device 11, thereby causing valve device 11 to establish fluid pressure communication between chamber 13 and pipe 20. Consequently, brake command signal BV is effective to control relay valve device 10 via diaphragm 13a and the vehicle load weighing apparatus 15, 16, 17, 18 and 18a. The resulting force applied to valve assembly 14 via stem 22 thus produces the friction brake pressure in accordance with the load compensated brake command. Although not shown, the friction brake command signal produced by the electrical comparison circuitry would be interrupted in response to a malfunction of the electrical comparison circuitry so as to not adversely influence the friction brake pressure obtained via brake command signal BV.

Thus, the arrangement of FIG. 3 embodying the present invention combines the advantages of an electrical comparison system providing fast response to changes in the friction brake requirement with variations in the electric brake effectiveness and an automatic back-up system capable of providing full friction braking to meet the total vehicle brake demand in the event a malfunction occurs in the electrical comparison system. Excessive cycling of the friction brakes with attendant train shocks and passenger discomfort is accordingly eliminated with the present invention.

Having now described the invention, what I claim as new and desire to secure by Letters Patent, is:

1. A brake blending control system for a vehicle having electric and friction brake apparatus, said control system comprising:
   (a) means for providing a fluid pressure brake command signal representing the desired degree of vehicle braking to be provided by said electric and friction brake apparatus;
   (b) said electric brake apparatus being operative responsive to said brake command signal;
   (c) means for providing a fluid pressure friction brake control signal comprising:
      (i) means for providing an electric feedback signal representing the effective brake effort produced by said electric brake apparatus in response to said brake command signal;
      (ii) first transducer means for converting said fluid pressure brake command signal to a corresponding electrical quantity;
      (iii) comparison means for providing an error signal in accordance with the difference between said electrical quantity representing said brake command signal and said feedback signal representing the effective electric brake effort; and
      (iv) second transducer means for converting said error signal to a corresponding fluid pressure signal to provide said friction brake control signal; and
   (d) a fluid pressure operated relay valve device having a first control port to which said friction brake control signal is connected, a second control port to which said brake command signal is connected, and a delivery port, said relay valve device being operative responsive to pressurization of said first or said second control port to provide fluid brake pressure via said delivery port to effect operation of said friction brake apparatus; and
   (e) valve means for normally cutting off said brake command signal from said second control port and for connecting said brake command signal to said second control port in response to a malfunction of said means providing said friction brake control signal.

2. The brake blending control system as recited in claim 1, further comprising:

(a) said first transducer means supplying said brake command signal to said electric brake apparatus in the form of said electrical quantity; and
(b) first load responsive means for modifying said electrical quantity according to the vehicle load condition.

3. The brake blending control system as recited in claim 2, further comprising second load responsive means for modifying the degree of response of said relay valve device to said brake command signal effective at said second control port thereof.

4. The brake blending control system as recited in claim 1, wherein said relay valve device comprises:
(a) first piston means operable responsive to fluid pressure in a first chamber having said first control port;
(b) a self-lapping valve assembly connected to said first piston means for actuation thereby to provide said fluid brake pressure via said delivery port;
(c) second piston means operable responsive to fluid pressure in a second chamber having said second control port;
(d) lever means via which said second piston means is engageable with said first piston means; and
(e) third piston means operable responsive to the load of said vehicle for adjusting the effective ratio of said lever means.

5. The brake blending control system as recited in claim 4, further comprising:
(a) said first transducer means supplying said brake command signal to said electric brake apparatus in the form of said electrical quantity; and
(b) first load responsive means for modifying said electrical quantity according to the vehicle load condition.

* * * * *